(12) United States Patent
Reski

(10) Patent No.: US 12,221,759 B2
(45) Date of Patent: *Feb. 11, 2025

(54) BALLAST TRAY ASSEMBLY FOR A TOWER STRUCTURE

(71) Applicant: GREAT PLAINS TOWER PRODUCTS LLC, Fargo, ND (US)

(72) Inventor: Kevin Reski, West Fargo, ND (US)

(73) Assignee: GREAT PLAINS TOWER PRODUCTS LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,933

(22) Filed: Sep. 26, 2023

(65) Prior Publication Data
US 2024/0125077 A1 Apr. 18, 2024

Related U.S. Application Data

(63) Continuation of application No. 18/046,313, filed on Oct. 13, 2022, now Pat. No. 11,814,807.

(51) Int. Cl.
| | |
|---|---|
| *E02D 27/42* | (2006.01) |
| *E02D 27/01* | (2006.01) |
| *E02D 27/02* | (2006.01) |
| *E04H 12/22* | (2006.01) |
| *F16M 5/00* | (2006.01) |

(52) U.S. Cl.
CPC ............ *E02D 27/42* (2013.01); *E02D 27/01* (2013.01); *E02D 27/02* (2013.01); *E04H 12/2246* (2013.01); *F16M 5/00* (2013.01)

(58) Field of Classification Search
CPC ....... E02D 27/42; E02D 27/32; E02D 27/013; E02D 27/08; E02D 2200/1628; E02D 27/02; E02D 27/01; E04H 12/2246; E04H 12/2238; E04H 17/009; F16M 5/00;
(Continued)

(56) References Cited

U.S. PATENT DOCUMENTS 1,578,829 A * 3/1926 Jennings ................. E02D 27/42
52/156
1,586,085 A 5/1926 Hill
(Continued)

FOREIGN PATENT DOCUMENTS

| CN | 104944300 A | 9/2015 |
| CN | 105569054 A | 5/2016 |

(Continued)

*Primary Examiner* — Taylor Morris
(74) *Attorney, Agent, or Firm* — Fargo Patent & Business Law; Thomas Kading

(57) ABSTRACT

A ballast tray assembly includes a support interface at the center of the ballast tray assembly, the support interface formed by a ballast tray assembly aperture arrangement through a multiple of flanges around a center compartment and an interface plate including a central aperture, a mount aperture arrangement, and an interface plate aperture arrangement, the central aperture located at the center of the interface plate at the center compartment, the mount aperture arrangement around the central aperture and within the interface plate aperture arrangement, the interface plate attachable to the support interface, the mount aperture arrangement specific to a lattice tower which is to be mounted to the interface.

8 Claims, 11 Drawing Sheets

(58) Field of Classification Search
CPC ...... H01Q 1/1207; H01Q 1/246; B01F 35/42; B44D 3/14
USPC .......................................... 248/678; 52/292
See application file for complete search history.

(56) References Cited

U.S. PATENT DOCUMENTS

| | | | |
|---|---|---|---|
| 1,670,339 A * | 5/1928 | Butterworth | E04G 13/021 |
| | | | 269/130 |
| 1,796,720 A | 3/1931 | Porter | |
| 2,036,047 A | 3/1936 | Hill | |
| 2,828,931 A | 4/1958 | Harvey | |
| 2,882,810 A | 4/1959 | Goettl | |
| 3,022,028 A | 2/1962 | Reinhard | |
| 3,119,588 A | 1/1964 | Keats | |
| 3,477,668 A | 11/1969 | Tippmann | |
| 4,185,288 A | 1/1980 | Dosch | |
| 4,191,356 A | 3/1980 | Ashmun | |
| 4,503,645 A * | 3/1985 | Nudd | E04H 12/2261 |
| | | | 52/651.01 |
| 4,649,675 A | 3/1987 | Moldovan | |
| 4,660,799 A | 4/1987 | Butland | |
| 4,785,593 A | 11/1988 | Munoz, Jr. | |
| 4,793,111 A * | 12/1988 | Shewchuk | F21V 21/10 |
| | | | 52/298 |
| 4,799,642 A * | 1/1989 | Wright | H01Q 1/1242 |
| | | | 343/890 |
| 4,922,264 A * | 5/1990 | Fitzgerald | H01Q 1/1242 |
| | | | 343/890 |
| 5,142,293 A | 8/1992 | Ross | |
| 5,149,050 A | 9/1992 | Smith | |
| 5,257,489 A | 11/1993 | Angelette | |
| 5,297,770 A | 3/1994 | Drexel | |
| 5,531,419 A | 7/1996 | Gustafsson | |
| 5,623,786 A * | 4/1997 | DeMeyer | E04B 7/16 |
| | | | 52/6 |
| 5,878,540 A | 3/1999 | Morstein | |
| 6,058,299 A | 5/2000 | Lyseng | |
| 6,095,482 A | 8/2000 | LaGrotta | |
| 6,199,818 B1 | 3/2001 | Tsappi | |
| 6,266,938 B1 | 7/2001 | Sheu | |
| 6,367,214 B1 * | 4/2002 | Monachino | E02D 27/02 |
| | | | 52/297 |
| 6,464,196 B1 | 10/2002 | Crookham | |
| 6,520,124 B2 * | 2/2003 | Bohm, II | F02B 63/04 |
| | | | 220/4.12 |
| 6,798,387 B2 | 9/2004 | Cockell | |
| 6,820,389 B1 | 11/2004 | Macchietto | |
| 6,889,953 B2 | 5/2005 | Harbaugh | |
| 6,981,685 B1 | 1/2006 | McHugh | |
| 7,098,864 B2 | 8/2006 | Ryan | |
| 7,191,792 B2 | 3/2007 | Hendrix | |
| 8,056,299 B2 | 11/2011 | Liskey | |
| 8,186,684 B2 * | 5/2012 | Oliver | E02D 27/02 |
| | | | 473/196 |
| 8,319,697 B2 | 11/2012 | Conrad | |
| 8,333,500 B1 | 12/2012 | Melvin | |
| 8,528,296 B1 * | 9/2013 | Miller | E02D 27/42 |
| | | | 52/741.15 |
| 8,695,305 B2 | 4/2014 | Gallagher | |
| 8,898,991 B2 * | 12/2014 | Cai | F03D 13/10 |
| | | | 52/651.01 |
| 9,015,999 B1 * | 4/2015 | Echemendia | E04H 12/08 |
| | | | 52/40 |
| 9,499,954 B2 | 11/2016 | Honglang | |
| 9,540,840 B2 | 1/2017 | Ma | |
| 9,669,369 B1 | 6/2017 | Mees | |
| 9,863,161 B2 | 1/2018 | Anderson | |
| 10,125,506 B2 | 11/2018 | Cusson | |
| 10,378,231 B1 | 8/2019 | Sharpe | |
| 10,422,150 B2 * | 9/2019 | Roy | E02D 27/42 |
| 10,501,957 B1 | 12/2019 | Borowiak | |
| 10,813,425 B2 | 10/2020 | Shen | |
| 10,826,156 B2 * | 11/2020 | Dominguez | H01Q 1/246 |
| 11,146,866 B2 | 10/2021 | Hon | |
| 11,242,694 B2 | 2/2022 | Bucarizza | |
| 2007/0158526 A1 * | 7/2007 | Platt | E04H 12/2261 |
| | | | 248/188.4 |
| 2008/0184633 A1 * | 8/2008 | Hamilton | E02D 27/42 |
| | | | 52/127.12 |
| 2009/0202307 A1 * | 8/2009 | Au | E02D 27/02 |
| | | | 405/233 |
| 2012/0131879 A1 | 5/2012 | Bergman | |
| 2012/0260592 A1 * | 10/2012 | Wolf | F03D 13/22 |
| | | | 52/698 |
| 2014/0059957 A1 | 3/2014 | Stark | |
| 2015/0101263 A1 * | 4/2015 | Price | E04B 1/34321 |
| | | | 52/169.1 |
| 2015/0308140 A1 | 10/2015 | Clifton | |
| 2015/0323124 A1 | 11/2015 | Erdos | |
| 2016/0251809 A1 * | 9/2016 | Ries | E01C 19/26 |
| | | | 404/130 |
| 2019/0177995 A1 * | 6/2019 | Klause | E02D 27/425 |
| 2021/0080068 A1 * | 3/2021 | Ducros | E04H 12/003 |
| 2021/0131055 A1 * | 5/2021 | Queen | E02D 5/801 |
| 2023/0094617 A1 | 3/2023 | Clark | |
| 2023/0265636 A1 * | 8/2023 | Jones | E04H 12/345 |
| | | | 52/120 |
| 2023/0323697 A1 * | 10/2023 | Audenaerde | E04H 12/2246 |
| | | | 248/519 |

FOREIGN PATENT DOCUMENTS

| | | | |
|---|---|---|---|
| CN | 111877390 A | 11/2020 | |
| CN | 112227411 A | 1/2021 | |
| DE | 10316029 B3 | 8/2004 | |
| DE | 102022106027 A1 | 9/2022 | |
| EP | 3342305 A1 | 7/2018 | |
| ES | 2307348 A1 | 11/2008 | |
| FR | 2811359 A3 | 1/2002 | |
| FR | 3127969 A1 | 4/2023 | |
| WO | WO-2022243491 A1 * | 11/2022 | B60L 53/31 |

* cited by examiner

BALLAST TRAY FOR GPT 30' 60'' SQ. TUBING + 4' TOP PIPE
(ANALYSIS PER TIA-222-G)

BASE REACTIONS $V = 0.57$ KIP $H = 1.9$ KIP $M = 38.5$ KIP-FT

BALLAST TRAY (1900#)
8'-6'' x 8'-6'' x 1'-4'' TALL

CHECK FOR OVERTURNING @ A $M_R = (1.90 + 0.57 + 12.5)(4.25) = 63.6$ K-FT $M_{O_A} = 38.5 + (1.9)(1.33) = 41.0$ K-FT $M_R/M_O = (63.6)/(41.0) = 1.55$ ∴ OK

WELDED BALLAST TRAY CONTAINS 3.1 CU YD (12,500#) OF CONCRETE IN BALLAST TRAY

CHECK FOR SLIDING $u = .3$ $F_{SL} = (0.3)(1.9 + 0.57 + 12.5) = 4.49$ KIP 4.49 KIP > 1.9 KIP ∴ ok

FIG. 13

BALLAST TRAY ASSEMBLY FOR A TOWER STRUCTURE

CROSS-REFERENCE TO RELATED APPLICATION(S)

The present disclosure is a Continuation of U.S. patent application Ser. No. 18/046,313 (01646-GRE) filed Oct. 13, 2022.

BACKGROUND

The present disclosure relates to tower structures, and more particularly to a ballast tray assembly thereof.

Equipment such as antennas, cameras, and the like are often mounted on tower structures to provide optimal operating positions. The towers are often mounted on a ballast tray assembly which supports the tower without having to install a pier in the ground. High wind conditions are a significant concern for all such towers.

SUMMARY

A ballast tray assembly according to one disclosed non-limiting embodiment of the present disclosure includes a support interface at the center of the ballast tray assembly, the support interface formed by a ballast tray assembly aperture arrangement through a multiple of flanges around a center compartment; and an interface plate including a central aperture, a mount aperture arrangement, and an interface plate aperture arrangement, the central aperture located at the center of the interface plate at the center compartment, the mount aperture arrangement around the central aperture and within the interface plate aperture arrangement, the interface plate attachable to the support interface, the mount aperture arrangement specific to a lattice tower which is to be mounted to the interface.

A further embodiment of any of the foregoing embodiments of the present disclosure includes a multiple of I-beams which comprise the multiple of flanges around the center compartment.

A further embodiment of any of the foregoing embodiments of the present disclosure includes that the multiple of I-beams include a first side I-beam; a second side I-beam parallel to the first side I-beam; a first cross I-beam between the first side I-beam and the second side I-beam and perpendicular thereto; a second cross I-beam between the first side I-beam and the second side I-beam and perpendicular thereto; a third cross I-beam between the first side I-beam and the second side I-beam and perpendicular thereto; a fourth cross I-beam between the first side I-beam and the second side I-beam and perpendicular thereto; and a first interface beam and a second interface beam parallel to the first side I-beam and the second side I-beam between the second cross I-beam and the third cross I-beam to provide a support interface at the center of the ballast tray assembly.

A further embodiment of any of the foregoing embodiments of the present disclosure includes a subfloor attached to the first side I-beam, the second side I-beam, the first cross I-beam, the second cross I-beam, the third cross I-beam, the fourth cross I-beam, the first interface beam, and the second interface beam.

A further embodiment of any of the foregoing embodiments of the present disclosure includes that each of the first, second, third and fourth cross I-beam comprises a flange with a profiled end to interface with the first side I-beam and the second side I-beam.

A further embodiment of any of the foregoing embodiments of the present disclosure includes that the ballast tray assembly forms a rectilinear arrangement with seven compartments.

A further embodiment of any of the foregoing embodiments of the present disclosure includes that each of the seven compartments comprise a drain hole through the subfloor.

A further embodiment of any of the foregoing embodiments of the present disclosure includes that the ballast tray assembly is 8.5 feet by 8.5 feet and 1 foot 4 inches tall, contains 3.1 cubic yards of concrete, and resists overturning and sliding for a 30 foot tall, 6 inch square tubing, lattice tower with a 6 foot tall top pipe mounted thereto.

A further embodiment of any of the foregoing embodiments of the present disclosure includes that the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

A further embodiment of any of the foregoing embodiments of the present disclosure includes that the central aperture is sized to receive a container.

A further embodiment of any of the foregoing embodiments of the present disclosure includes that the container comprises a bucket.

A ballast tray assembly for a lattice tower according to one disclosed non-limiting embodiment of the present disclosure includes a first side I-beam; a second side I-beam parallel to the first side I-beam; a first cross I-beam welded between the first side I-beam and the second side I-beam and perpendicular thereto; a second cross I-beam welded between the first side I-beam and the second side I-beam and perpendicular thereto; a third cross I-beam welded between the first side I-beam and the second side I-beam and perpendicular thereto; a fourth cross I-beam welded between the first side I-beam and the second side I-beam and perpendicular thereto, wherein the first cross I-beam, the second cross I-beam, the third cross I-beam, and the fourth cross I-beam each include profiled ends to interface with the first side I-beam and the second side I-beam; a first interface beam and a second interface beam parallel to the first side I-beam and the second side I-beam welded between the second cross I-beam and the third cross I-beam to provide a support interface at the center of the ballast tray assembly around a center compartment; and an interface plate including a central aperture, and a mount aperture arrangement, the central aperture located at the center of the interface plate at the center compartment, the mount aperture arrangement around the central aperture, the mount aperture arrangement specific to a lattice tower which is to be mounted to the interface plate.

A further embodiment of any of the foregoing embodiments of the present disclosure includes a pad eye mounted to a lower flange adjacent each corner of the ballast tray.

A further embodiment of any of the foregoing embodiments of the present disclosure includes that the interface plate is welded to the support interface.

A further embodiment of any of the foregoing embodiments of the present disclosure includes that the lattice tower is attachable to the mount aperture arrangement via a fastener through each aperture of the mount aperture arrangement and the lattice tower.

A further embodiment of any of the foregoing embodiments of the present disclosure includes that the interface plate comprises an interface plate aperture arrangement, the mount aperture arrangement around the central aperture and within the interface plate aperture arrangement, a support interface formed by flanges of the I-beams around the center compartment, the flanges comprise a ballast tray assembly aperture arrangement, the interface plate attachable to the support interface at the ballast tray assembly aperture arrangement.

A further embodiment of any of the foregoing embodiments of the present disclosure includes that the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

A further embodiment of any of the foregoing embodiments of the present disclosure includes a subfloor attached to the first side I-beam, the second side I-beam, the first cross I-beam, the second cross I-beam, the third cross I-beam, the fourth cross I-beam, the first interface beam, and the second interface beam.

A further embodiment of any of the foregoing embodiments of the present disclosure includes wherein the ballast tray assembly is sized to contain 3.1 cubic yards of concrete.

A further embodiment of any of the foregoing embodiments of the present disclosure includes a first routing aperture though the fourth cross I-beam and a second routing aperture through the third cross I-beam, wherein the first routing aperture and the second routing aperture are 4 inches in diameter through which is mounted a pipe.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 13 is a mathematical representation of the ballast tray resistance to overturning and sliding according to a disclosed non-limiting embodiment.

DETAILED DESCRIPTION

Figure 1:
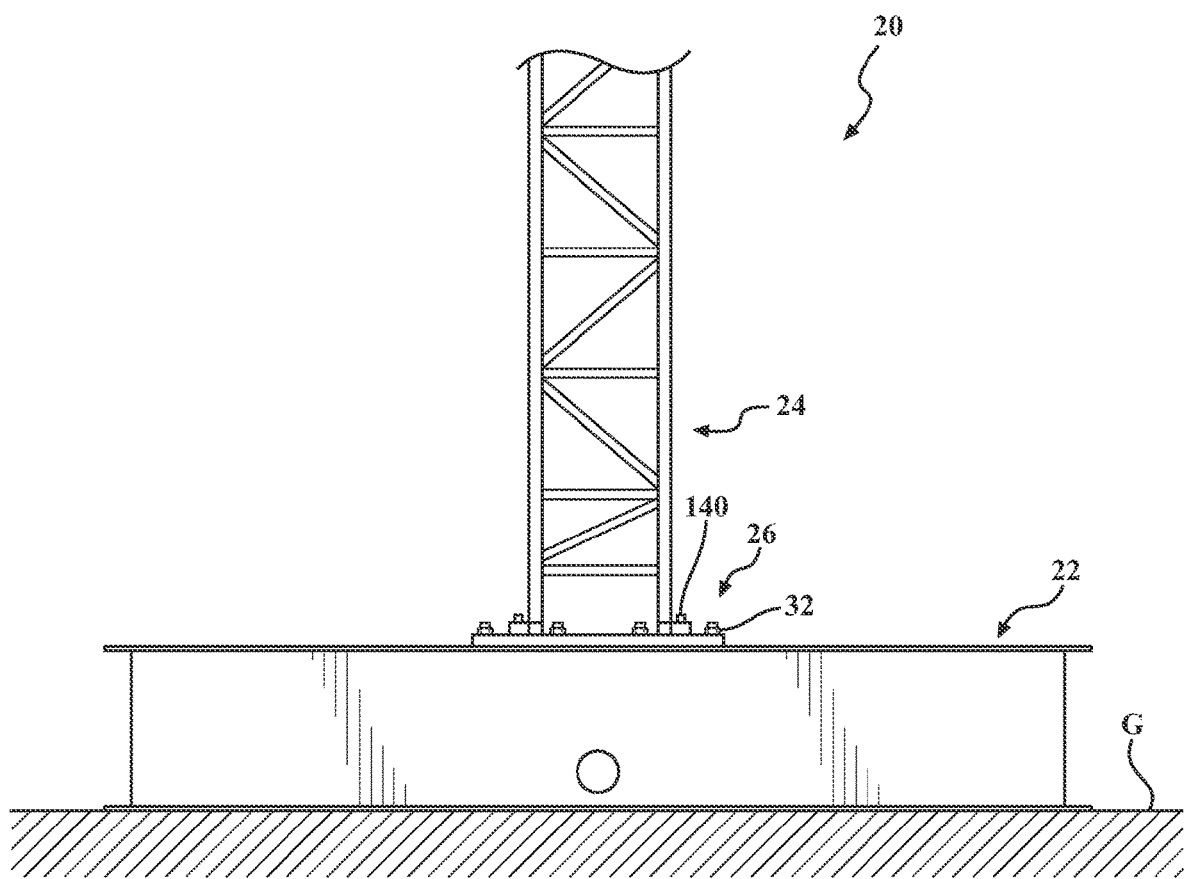
FIG. 1 is a schematic side view of a tower structure according to one disclosed non-limiting embodiment.

FIG. 1 schematically illustrates a tower structure 20 that is utilized to erect various instruments. The tower structure 20 generally includes a ballast tray 22 that is located on the ground G to support a lattice tower 24 via an interface plate 26. The ballast tray 22 in this embodiment is 8.5 feet by 8.5 feet and 16 inches tall. The ballast tray 22 is typically filled with a concrete material, in one example, 12,500 pounds of concrete within a 1,900 pound ballast tray 22, to provides a stable base for the lattice tower 24 which is mounted thereto via the interface plate 26. Although the lattice tower 24 is illustrated in this disclosed embodiment, the interface plate 26 may provide an interface for various other poles, towers, etc.

Figure 2:
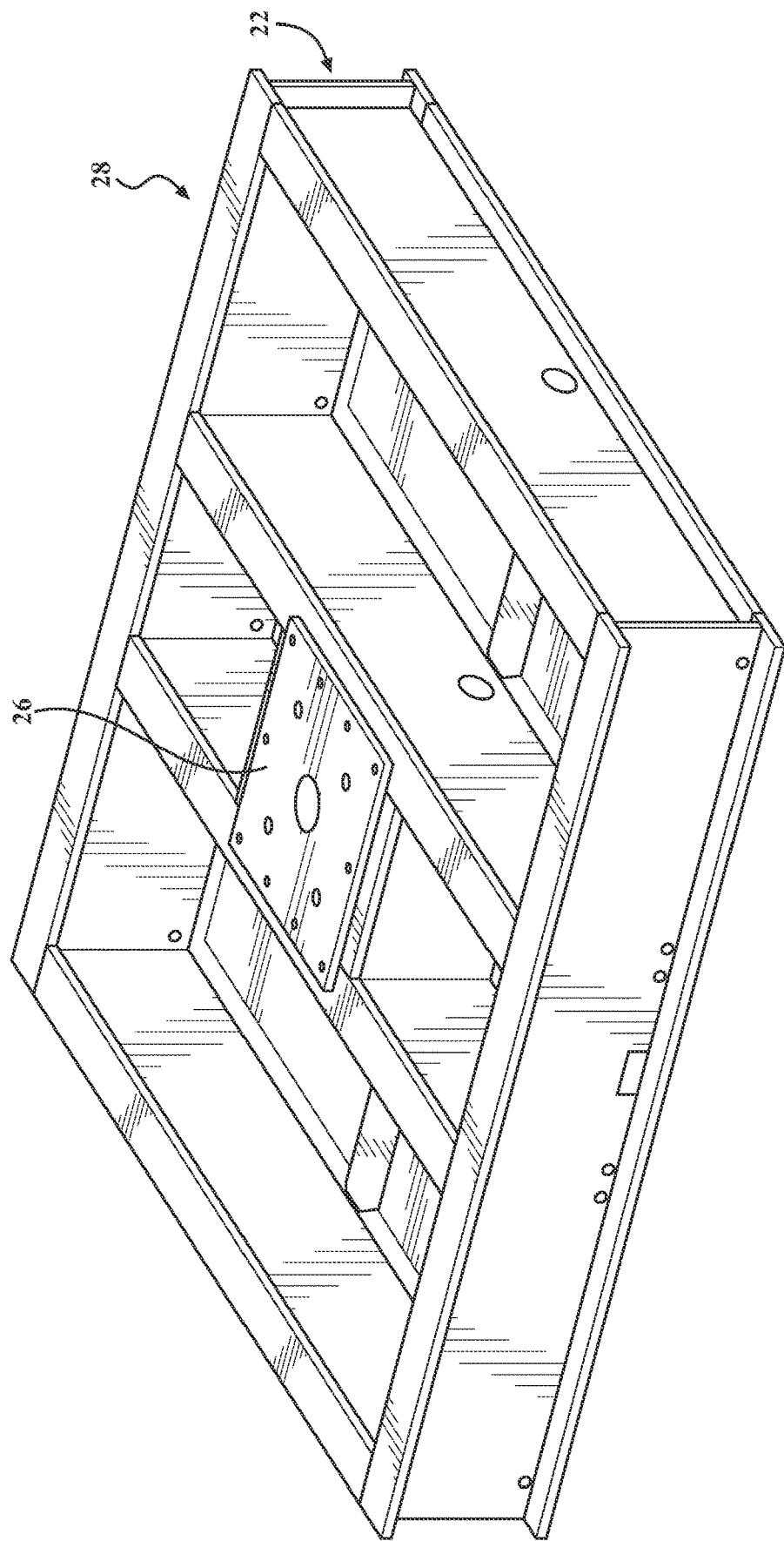
FIG. 2 is a perspective view of a ballast tray assembly according to a disclosed non-limiting embodiment.
Figure 3:
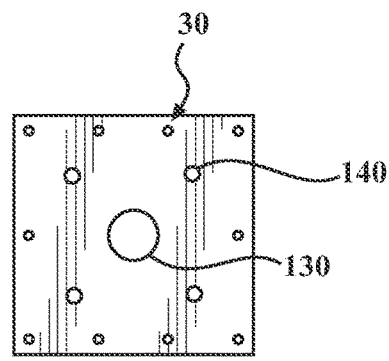
FIG. 3 is an expanded top view of an interface plate according to a disclosed non-limiting embodiment.

With reference to FIG. 2, the ballast tray 22 is a common component which is individualized by attachment of one of a multiple different interface plates 26, each of which provide the mounting arrangement for that which is supported by a ballast tray assembly 28. That is, the interface plate 26 includes an interface plate aperture arrangement 30 (FIG. 3) which corresponds with a ballast tray assembly aperture arrangement 32 (FIG. 4) on the ballast tray 22 but also includes a mount aperture arrangement 140 (FIG. 3) which is specific to a lattice tower which is mounted to the interface plate. Alternatively, the interface plate 26 may be welded to the ballast tray 22.

Figure 4:
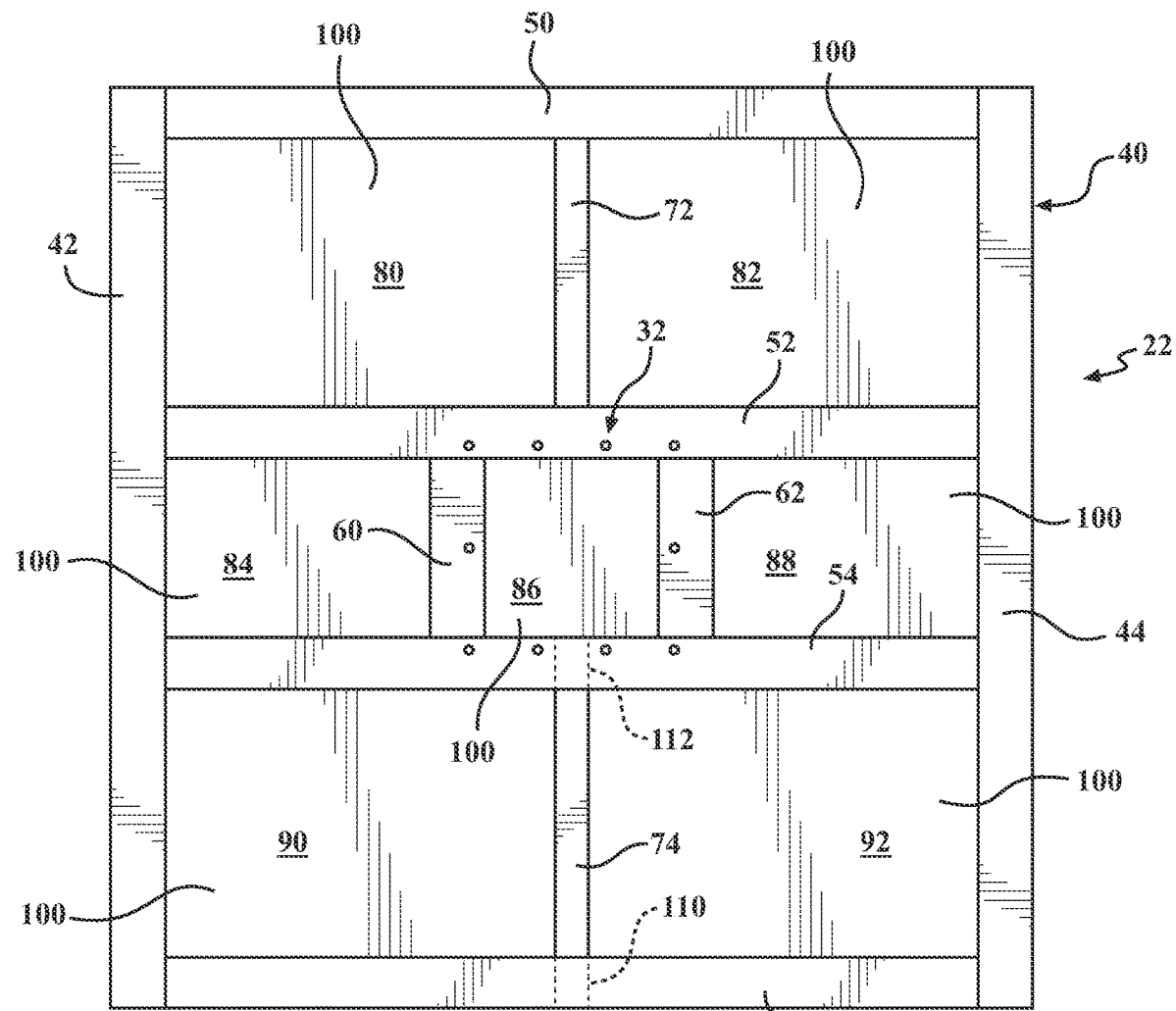
FIG. 4 is a top view of a ballast tray assembly according to a disclosed non-limiting embodiment.
Figure 5:
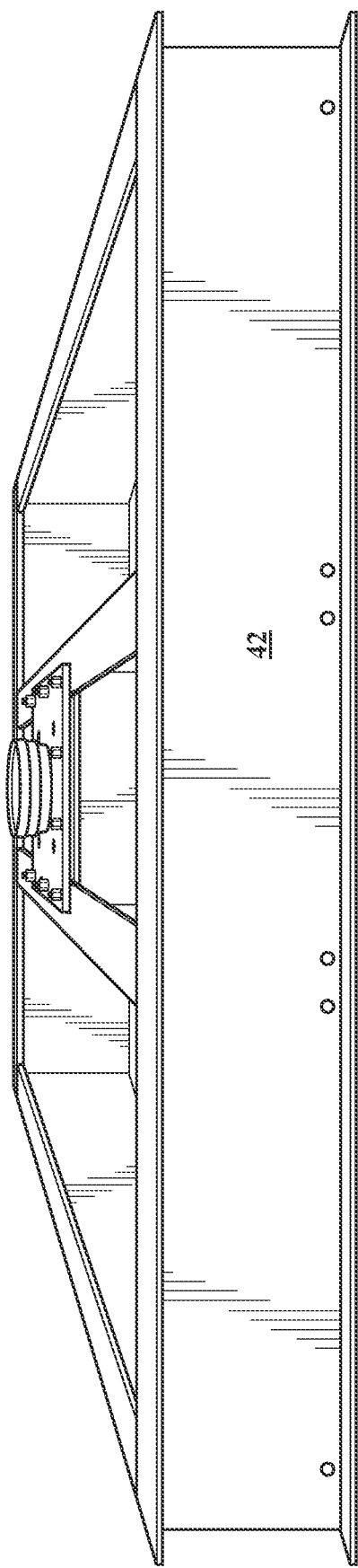
FIG. 5 is a front view of a ballast tray assembly.
Figure 6:
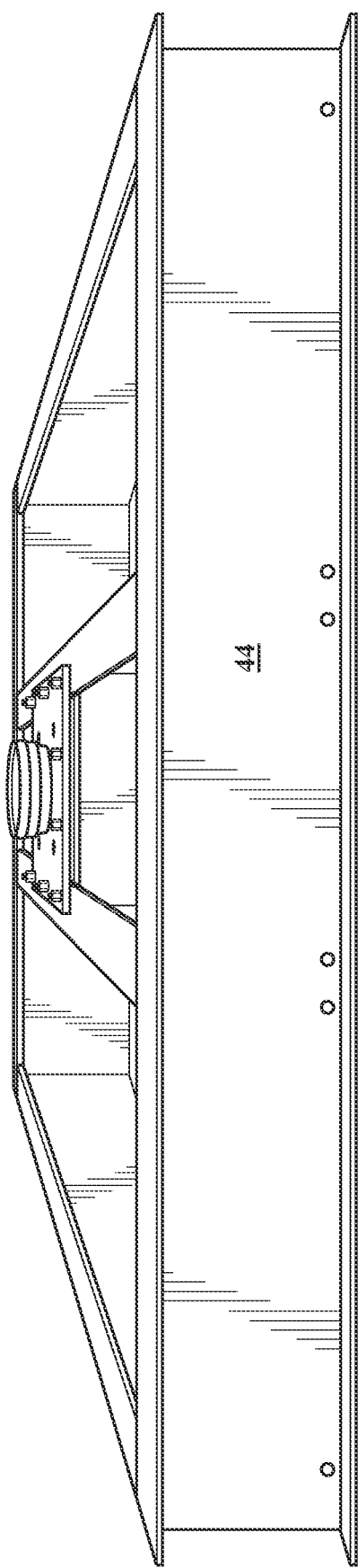
FIG. 6 is a rear view of a ballast tray assembly.
Figure 7:
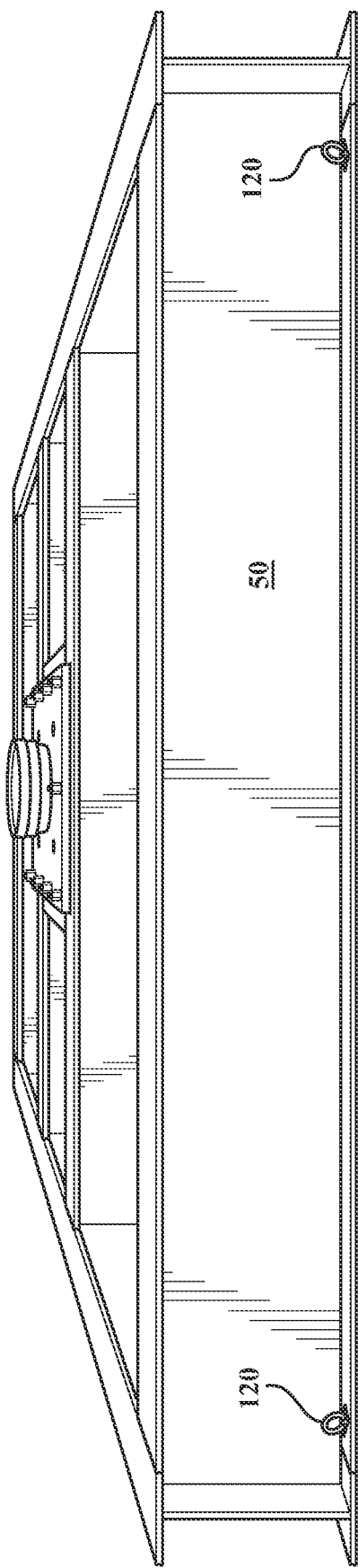
FIG. 7 is a first side view of a ballast tray assembly.
Figure 8:
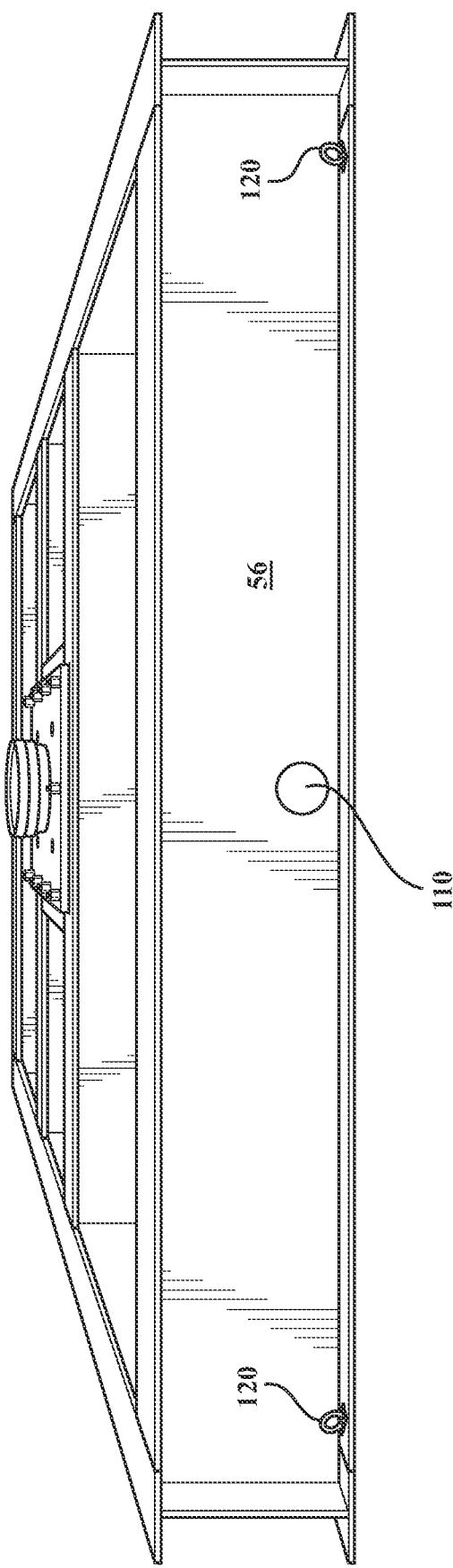
FIG. 8 is a second side view of a ballast tray assembly.
Figure 9:
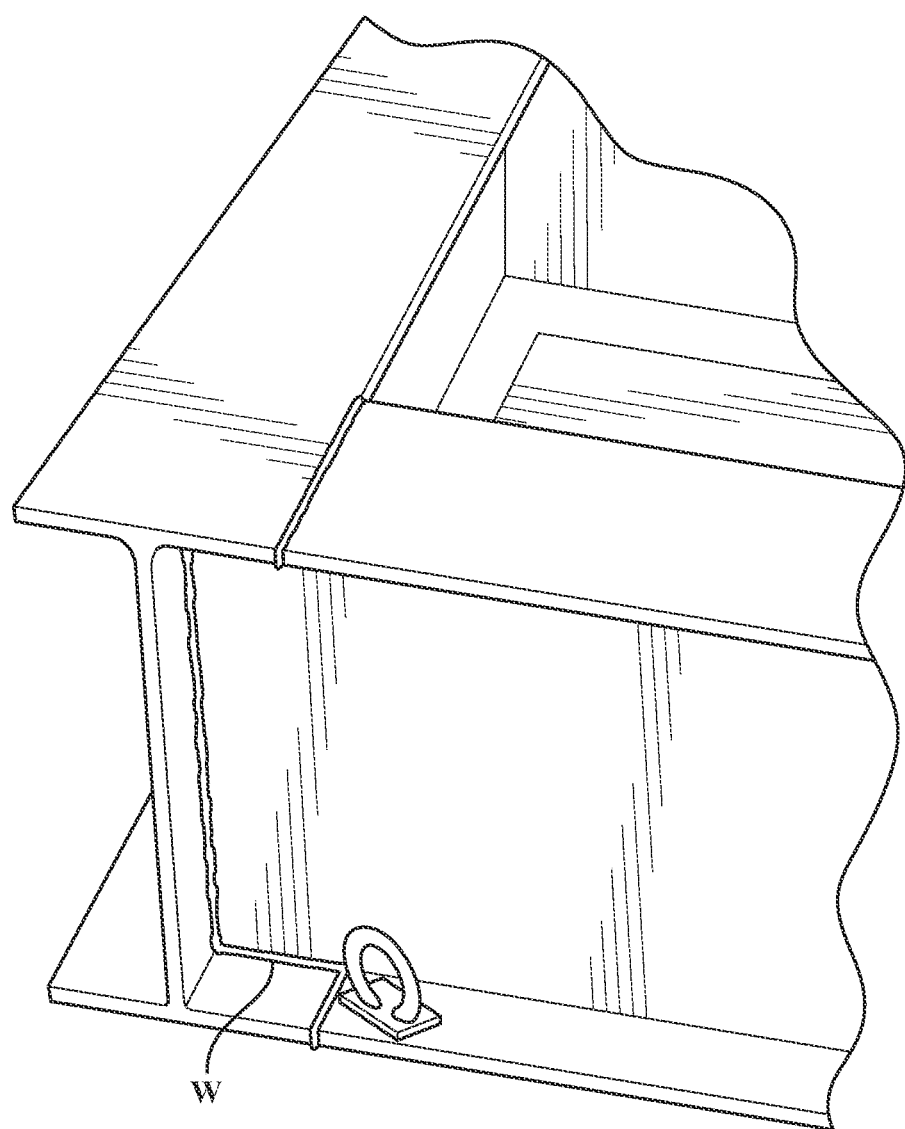
FIG. 9 is a corner perspective view of a ballast tray assembly showing a weld.

With reference to FIG. 4, the ballast tray 22 is typically manufactured primarily of metallic materials such as steel I-beams which are welded together in a rectilinear arrangement of I-beams. A first side-beam 42 (FIG. 5) and a second side-beam 44 (FIG. 6) sandwich a first cross-beam 50 (FIG. 7), a second cross-beam 52, a third cross-beam 54, and a fourth cross-beam 56 (FIG. 8) therebetween. The first cross-beam 50, the second cross-beam 52, the third cross-beam 54, and the fourth 56 cross-beam may include profiled ends to interface with the first side-beam 42 and the second side-beam 44 to facilitate welding W (FIG. 9) therebetween. A first interface beam 60 and a second interface beam 62 are parallel to the first side beam 42 and the second side-beam 44 between the second cross-beam 52 and the third cross-beam 54 to provide a support interface for the interface plate 26.

Figure 10:
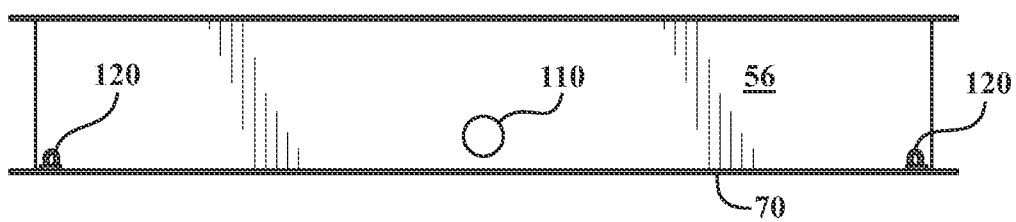
FIG. 10 is a side view of a ballast tray assembly according to a disclosed non-limiting embodiment.
Figure 11:
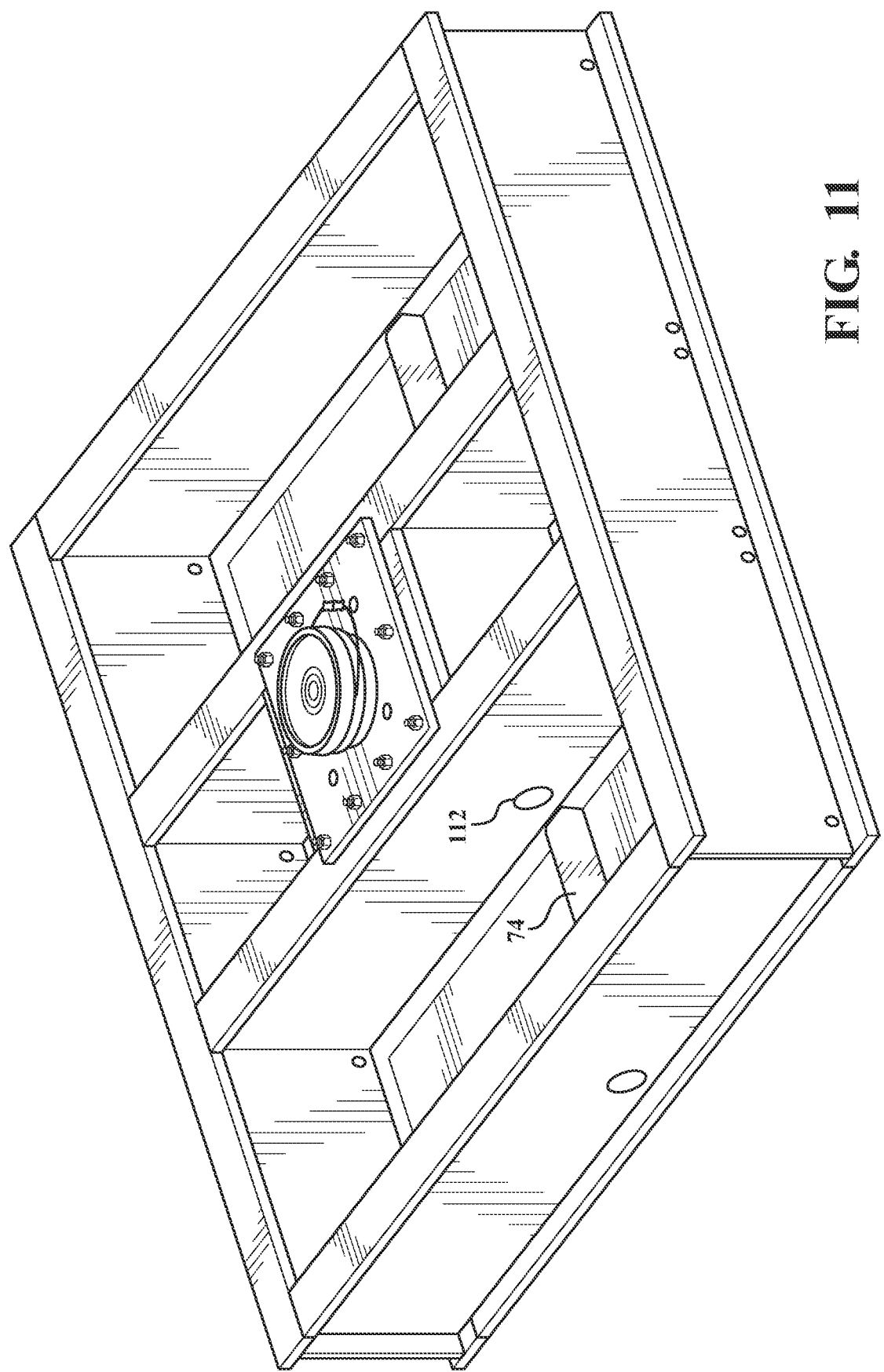
FIG. 11 is a top perspective view of a ballast tray assembly according to a disclosed non-limiting embodiment.

A sub floor 70 (FIG. 10) and floor supports 72, 74 (also shown in FIG. 11) are welded to the rectilinear arrangement 40 to receive the concrete. The rectilinear arrangement 40 in this embodiment forms seven compartments 80, 82, 84, 86, 88, 90, 92, each of which may include a drain hole 100. The floor supports 72, 74 are parallel to the first side-beam 42 and the second side-beam 44 and are defined along an axis A that passes through a center B of the ballast tray 22.

A first routing aperture 110 (FIGS. 8 and 10), and a second routing aperture 112, (FIG. 11) may be respectively located though the fourth cross-beam 56 and the third cross-beam 54, to provide for cable routing. The first and second routing aperture 110, 112, may, for example, be 4 inches in diameter to receive a pipe such as a PVC pipe. The first and second routing aperture 110, 112, provide a cable path to the center compartment 86 for routing cable, wires, etc. to the equipment on the lattice tower 24 or that which is supported by the ballast tray 22.

A pad eye 120 may be mounted adjacent each corner of the ballast tray 22 such as on the first cross-beam 50 and the fourth cross-beam 56. The pad eyes 120 provide for convenient integral lifting of the ballast tray 22.

Figure 12:
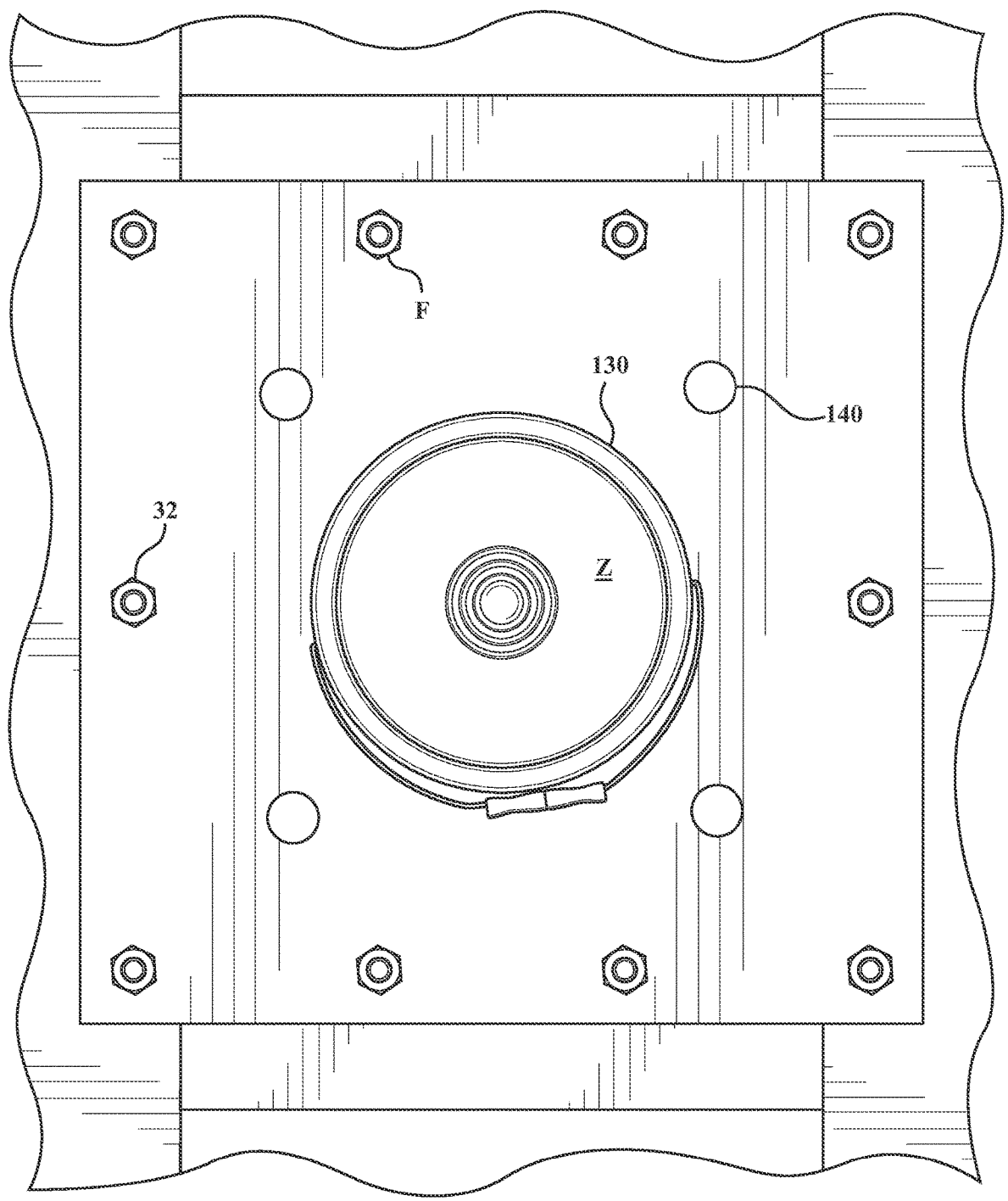
FIG. 12 is a perspective top view of an interface plate according to a disclosed non-limiting embodiment illustrating a bucket retained thereby.

The beams around the center compartment 86, (the second cross-beam 52, the third cross-beam 54, the first interface beam 60 and the second interface beam 62 supports the interface plate 26 (FIG. 12). The flanges around the center compartment 86 include the ballast tray assembly aperture arrangement 32, here shown as ten apertures, which correspond to the interface plate aperture arrangement 30. The interface plate 26 is attached via the ballast tray assembly aperture arrangement 32 and the interface plate aperture arrangement 30 with a multiple of fasteners F (FIG. 12).

With reference to FIG. 12, the interface plate 26 includes the mount aperture arrangement, here shown as four apertures, within the interface plate aperture arrangement 30. A central aperture 130 is located at the center of the interface plate 26 and within the mount aperture arrangement. The central aperture 130 in the disclosed embodiment is sized to receive a container such as a bucket Z that contains the hardware, i.e., nuts, bolts, etc., for assembly of the lattice tower 24 to the interface plate 26. The storage of the bucket within the central aperture 130 facilitates transport and organization of ballast tray 22 and an associated interface plate 26 and hardware therefor.

In one example, per the TIA-222-G, Structural Standard for Antenna Supporting Structures and Antennas, Applicant has determined that the ballast tray 22 and the associated interface plate 26 effectively resists overturning and sliding for a 30 foot tall 6 inch square tubing and a 6 foot tall top pipe (FIG. 13).

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A ballast tray assembly, comprising:
   a support interface at the center of the ballast tray assembly which forms a rectilinear arrangement with seven compartments, the support interface formed by a ballast tray assembly aperture arrangement through a multiple of flanges around a center compartment; and
   an interface plate comprising a central aperture, a mount aperture arrangement and an interface plate aperture arrangement, the central aperture located at the center of the interface plate at the center compartment, the mount aperture arrangement around the central aperture and within the interface plate aperture arrangement, the interface plate attachable to the support interface, the mount aperture arrangement specific to a lattice tower which is to be mounted to the interface plate.

2. The ballast tray assembly as recited in claim 1, wherein each of the seven compartments comprise a drain hole through a subfloor.

3. The ballast tray assembly as recited in claim 1, wherein the ballast tray assembly is 8.5 feet by 8.5 feet and 1 foot 4 inches tall, contains 3.1 cubic yards of concrete, and resists overturning and sliding for a lattice tower that is 30 foot tall and manufactured of 6 inch square tubing, with a 6 foot tall top pipe mounted thereto.

4. The ballast tray assembly as recited in claim 1, wherein the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

5. The ballast tray assembly as recited in claim 1, wherein the central aperture is sized to receive a container.

6. A ballast tray assembly, comprising:
   a support interface at the center of the ballast tray assembly, the support interface formed by a ballast tray assembly aperture arrangement through a multiple of flanges around a center compartment; and
   an interface plate comprising a central aperture sized to receive a bucket, a mount aperture arrangement, and an interface plate aperture arrangement, the central aperture located at the center of the interface plate at the center compartment, the mount aperture arrangement around the central aperture and within the interface plate aperture arrangement, the interface plate attachable to the support interface, the mount aperture arrangement specific to a lattice tower which is to be mounted to the interface plate.

7. A ballast tray assembly for a lattice tower, comprising:
   a first side I-beam,
   a second side I-beam parallel to the first side I-beam;
   a first cross I-beam welded between the first side I-beam and the second side I-beam and perpendicular thereto;
   a second cross I-beam welded between the first side I-beam and the second side I-beam and perpendicular thereto;
   a third cross I-beam welded between the first side I-beam and the second side I-beam and perpendicular thereto;
   a fourth cross I-beam welded between the first side I-beam and the second side I-beam and perpendicular thereto, wherein the first cross I-beam, the second cross I-beam, the third cross I-beam, and the fourth cross I-beam each include profiled ends to interface with the first side I-beam and the second side I-beam;
   a first interface beam and a second interface beam parallel to the first side I-beam and the second side I-beam welded between the second cross I-beam and the third cross I-beam to provide a support interface at the center of the ballast tray assembly around a center compartment; and
   an interface plate comprising a central aperture, and a mount aperture arrangement, the central aperture located at the center of the interface plate at the center compartment, the mount aperture arrangement around the central aperture, the mount aperture arrangement specific to a lattice tower which is to be mounted to the interface plate wherein the interface plate comprises an interface plate aperture arrangement, the mount aperture arrangement around the central aperture and within the interface plate aperture arrangement, a support interface formed by flanges of the I-beams around the center compartment, the flanges comprise a ballast tray assembly aperture arrangement, the interface plate attachable to the support interface at the ballast tray assembly aperture arrangement.

8. The ballast tray assembly as recited in claim 7, wherein the interface plate is attachable to the support interface via a fastener through each aperture of the ballast tray assembly aperture arrangement and a respective aperture of the interface plate aperture arrangement, the lattice tower attached to the mount aperture arrangement via a fastener through each aperture of the mount aperture arrangement and the lattice tower.

* * * * *